US008672592B2

(12) United States Patent
Guy

(10) Patent No.: US 8,672,592 B2
(45) Date of Patent: Mar. 18, 2014

(54) MILLING COLLET HAVING PULL-OUT PREVENTER FOR RETAINING A FLUTED MILLING TOOL

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 13/473,387

(22) Filed: May 16, 2012

(65) Prior Publication Data

US 2013/0309035 A1  Nov. 21, 2013

(51) Int. Cl.
*B23B 31/20* (2006.01)

(52) U.S. Cl.
USPC .............. 408/240; 279/42; 279/46.4; 279/48

(58) Field of Classification Search
USPC ......... 408/226, 240; 279/42, 43.1, 43.4, 43.5, 279/46.3, 46.4, 46.5, 46.6, 48, 69, 125, 157
See application file for complete search history.

(56) References Cited

U.S. PATENT DOCUMENTS

| | | | | | |
|---|---|---|---|---|---|
| 717,199 | A | * | 12/1902 | Hollm | 408/140 |
| 1,886,224 | A | * | 11/1932 | Redinger | 279/52 |
| 2,529,396 | A | * | 11/1950 | Hunt | 279/52 |
| 2,678,826 | A | * | 5/1954 | Nick | 279/48 |
| 2,896,956 | A | * | 7/1959 | Ann | 279/46.5 |
| 3,036,839 | A | * | 5/1962 | Williamson, Jr. | 279/24 |
| 3,136,561 | A | * | 6/1964 | McAuliffe et al. | 279/46.4 |
| 3,152,810 | A | * | 10/1964 | Brinkman | 279/46.3 |
| 3,195,909 | A | * | 7/1965 | Winnen | 279/51 |
| 3,556,540 | A | * | 1/1971 | Benjamin et al. | 279/47 |
| 3,618,962 | A | * | 11/1971 | Cox et al. | 279/82 |
| 3,762,731 | A | * | 10/1973 | Matsumoto | 279/51 |
| 3,764,153 | A | * | 10/1973 | Miller | 279/86 |
| 3,830,135 | A | * | 8/1974 | Sullivan | 409/234 |
| 4,046,390 | A | * | 9/1977 | Dunham | 279/46.8 |
| 4,197,044 | A | * | 4/1980 | Cummings | 409/232 |
| 4,341,006 | A | * | 7/1982 | Staron | 29/434 |
| 4,902,045 | A | * | 2/1990 | McGugan et al. | 285/24 |
| 4,902,177 | A | * | 2/1990 | Burnett | 409/234 |
| 4,955,764 | A | * | 9/1990 | Reinauer | 408/59 |
| 4,990,038 | A | * | 2/1991 | DeLong | 408/127 |
| 5,152,541 | A | * | 10/1992 | Baumgartner et al. | 279/8 |
| 5,324,050 | A | * | 6/1994 | Kanaan | 279/46.7 |
| 5,460,388 | A | * | 10/1995 | Lewis et al. | 279/42 |
| 5,467,476 | A | * | 11/1995 | Kawasaki | 712/23 |
| 7,364,390 | B2 | * | 4/2008 | Krenzer et al. | 408/230 |
| 8,029,216 | B2 | | 10/2011 | Guy | |
| 2007/0231094 | A1 | * | 10/2007 | Guy | 408/239 R |
| 2009/0179368 | A1 | | 7/2009 | Haimer | |
| 2009/0322042 | A1 | | 12/2009 | Kitamura | |

FOREIGN PATENT DOCUMENTS

| | | |
|---|---|---|
| DE | 29 16 947 | 4/1979 |
| DE | 3913626 A1 * | 10/1990 |
| SU | 387791 A * | 10/1973 |

* cited by examiner

*Primary Examiner* — Eric A Gates
*Assistant Examiner* — Paul M Janeski
(74) *Attorney, Agent, or Firm* — Womble Carlyle

(57) ABSTRACT

A pull-out preventer and milling collet that includes the pull-out preventer. The pull-out preventer is configured to prevent axial migration of a fluted milling tool out of the milling collet. The milling collet includes a through-hole extending from a rear-end aperture to an opposing cutting-end aperture of a basic body thereof. The pull-out preventer is located at the cutting-end aperture of the basic body.

21 Claims, 6 Drawing Sheets

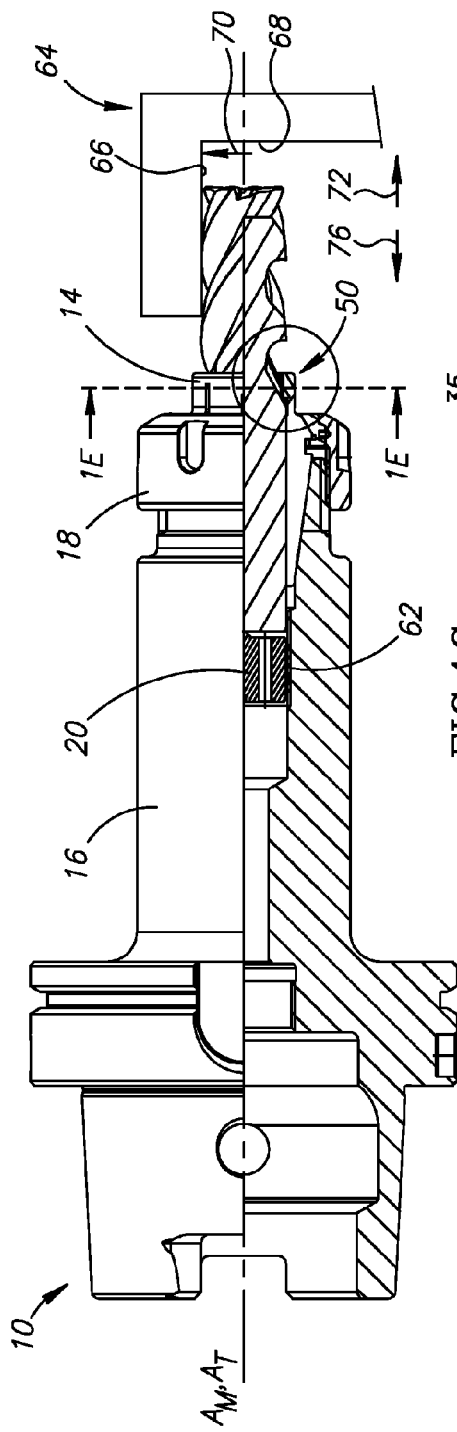
FIG.1C
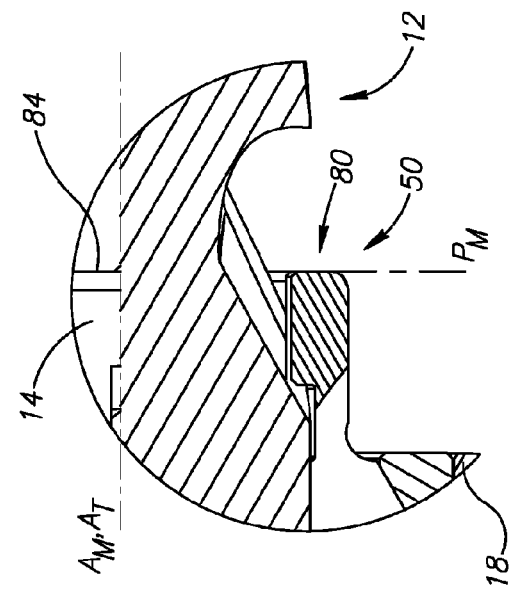
FIG.1D
FIG.1E

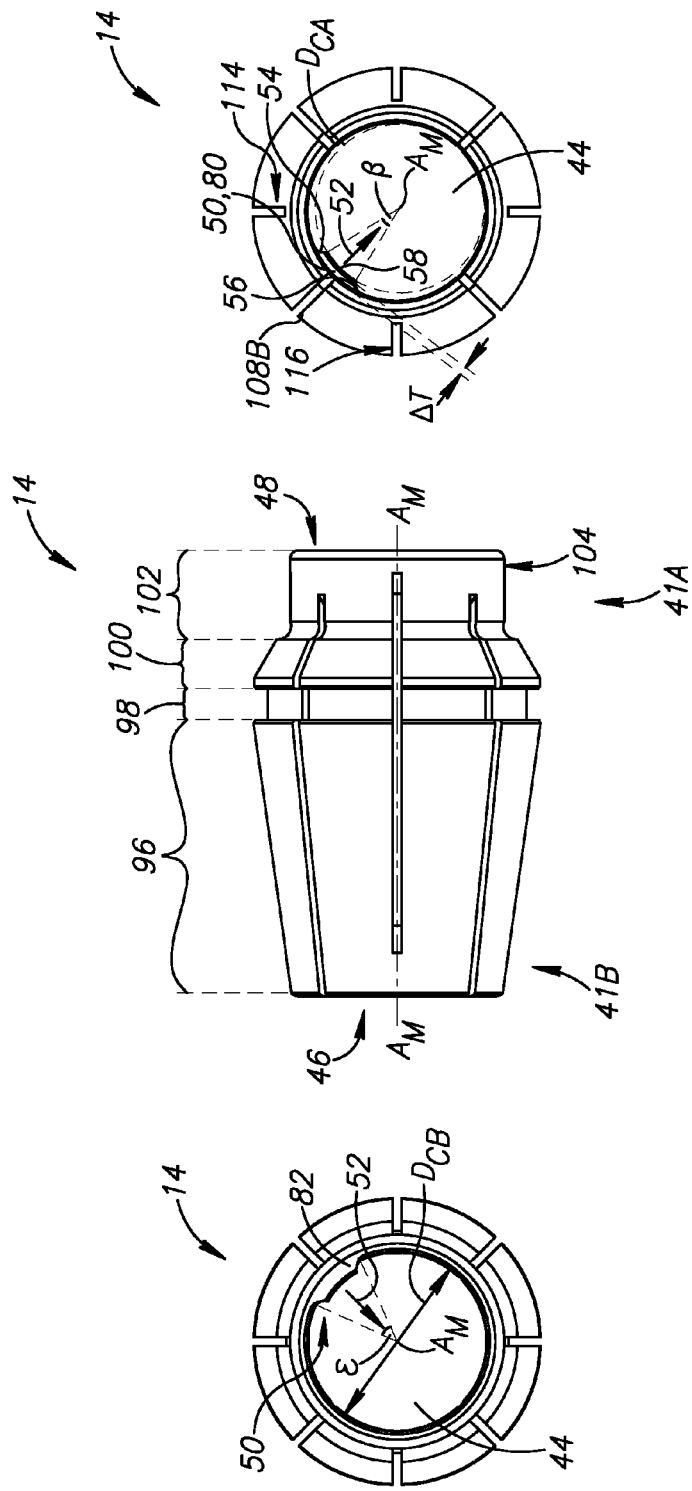

MILLING COLLET HAVING PULL-OUT PREVENTER FOR RETAINING A FLUTED MILLING TOOL

FIELD OF THE INVENTION

The subject matter of the present application relates to a pull-out preventer configured to engage a fluted metal-working tool, and, in particular, a milling collet comprising such pull-out preventer.

BACKGROUND OF THE INVENTION

A problem that can occur during milling operations is axial migration or extraction of a tool from a milling collet (such as a spring collet or exact-size collet) which holds it. Stated differently, forces acting on the tool, during cutting of a workpiece, can cause the tool to be pulled-out of the milling collet.

US 2009/0179368 discloses a system comprising a tool holder and a tool, where the tool holder comprises a tool holding fixture, preferably a clamping chuck, and the tool shaft portion, in particular of the rotation tool, is received therein, wherein the system comprises a pull-out preventer locking the tool against an axial migration out of the tool holder.

U.S. Pat. No. 8,029,216 discloses a chuck and article having mating features to prevent axial slippage.

SUMMARY OF THE INVENTION

In accordance with a first aspect of the subject matter of the present application, there is provided a pull-out preventer configured for stopping relative motion of a tooth of a fluted-cutting portion of a tool.

More precisely, the pull-out preventer can be configured for preventing rotational motion of the tooth relative to the pull-out preventer. Stopping rotational motion has been found to prevent axial motion and hence extraction of a tool from a milling collet holding same. Surprisingly, it has been found that a pull-out preventer that can be slidingly inserted into and removed from an open ended flute can be effective in preventing pull-out of a tool.

A possible benefit of a pull-out preventer may be use thereof in particular for roughing operations or incorporation into components configured for roughing operations etc., as such operations and components may be subject to higher forces than finishing tools. Nonetheless, a pull-out preventer may also benefit some non-roughing operations and components therefor.

The pull-out preventer could be part of a tool component, for example a milling collet.

In accordance with another aspect of the subject matter of the present application, there is provided a milling collet comprising a pull-out preventer located at a cutting-end aperture of the milling collet.

In accordance with yet another aspect of the subject matter of the present application, there is provided a milling collet comprising a sleeve-shaped basic body having a longitudinal milling collet axis, and a pull-out preventer comprising at least one member which projects in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; wherein the pull-out preventer is located at the cutting-end aperture.

It will be understood that a pull-out preventer can facilitate a milling collet configured for use with standard or non-customized tool components (cutting unit, chuck, tool, etc.).

It will also be understood that milling collets can be configured with constructional strength sufficient to withstand bending forces applied on a tool being held thereby during a lateral cutting operation.

In accordance with still another aspect of the subject matter of the present application, there is provided a cutting unit comprising a tool and a milling collet, the milling collet comprising a pull-out preventer configured to engage a fluted-cutting portion of the tool.

In accordance with a further aspect of the subject matter of the present application, there is provided a cutting unit comprising: a fluted milling tool comprising a tool shaft portion and a fluted-cutting portion, and a milling collet comprising a sleeve-shaped basic body having a longitudinal milling collet axis, and a pull-out preventer and comprising at least one member which projects in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; the pull-out preventer being located within a flute of the fluted-cutting portion.

In accordance with an aspect of the subject matter of the present application, there is provided a method of retaining a fluted milling tool configured for lateral cutting, the method comprising: providing a milling collet comprising a sleeve-shaped basic body having a longitudinal milling collet axis and a pull-out preventer comprising at least one member which projects in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; and inserting the fluted milling tool into the through hole of the milling collet such that the pull-out preventer of the milling collet projects into a flute of the fluted milling tool.

In accordance with still another aspect of the subject matter of the present application, there is provided a method of assembling and operating a cutting unit comprising a fluted milling tool and a milling collet; the milling collet comprising a sleeve-shaped basic body having a longitudinal milling collet axis, and a pull-out preventer comprising at least one member which projects in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; the method comprising: assembling the cutting unit such that the pull-out preventer of the milling collet projects into a flute of the fluted milling tool; and carrying out a lateral machining operation.

A lateral machining operation or lateral cutting includes lateral or side contact between a tool and a workpiece, such contact resulting in cutting of the workpiece, as opposed to an axial cutting motion (such as drilling).

In accordance with a further aspect of the subject matter of the present application, there is provided a method of designing a pull-out preventer, comprising: measuring flute dimensions of a set of related tools produced by a common manufacturer and having a common diameter; and sizing the pull-out preventer to a maximum size that allows it to be disposed within a flute end of the smallest flute in the set.

Related tool sets or collets therefor could be determined, for example, via indications in catalogue or other advertisements. For example, a set of related tools could be advertised in a single location or common section in a catalogue, tools in the set could have a common designation code, a collet could be indicated as suitable for use with more than one member of a set of tools, etc.

In accordance with another aspect of the subject matter of the present application, there is provided a process for manufacturing a pull-out preventer comprising: manufacturing a basic body of a collet having a longitudinal collet axis; and milling an interior of a cutting-end aperture of the basic body to reduce the diameter thereof except for at least one portion, the at least one portion constituting a radially inwardly projecting pull-out preventer comprising at least one member which projects in a radially inward direction, when the collet is viewed along the collet axis.

It is understood that the above-said is a summary, and that any of the aspects above may further comprise any of the features described in connection with any of the other aspects or described hereinbelow. For example, any of the following features may be applicable to any of the above aspects of the present application:

i. An inscribed diameter at a cutting-end aperture can be smaller than an inscribed diameter at a rear-end.

ii. A pull-out preventer can extend in a radially-inward direction into a through-hole. The pull-out preventer extension into the through hole can be limited to a smallest flute height and/or end flute height of a tool. The smallest height or end flute height can be of a smallest dimensioned flute in a set of related tools.

iii. A milling collet can be of a compressible type. For example, the milling collet can be of a spring or exact-size type.

iv. A milling collet can have a continuous cutting-end.

v. A pull-out preventer can be located at a cutting-end aperture.

vi. A pull-out preventer can comprise a single member only. It will be understood that a single member pull-out preventer can provide a possible advantage of suiting a greater number of tools, i.e. having different numbers of flutes.

vii. A pull-out preventer can be constituted by at least two members. Such configuration can possibly have less vibration than a single member. Such configuration can possibly have greater strength than a single member, as two or more members can allow for a greater volume of material to be designed for particular flute dimensions.

viii. At least one slit can be formed along a basic body. The at least one slit can extend longitudinally along the basic body. At least one of the at least one slits can comprise a first end that opens out at a rear-end of the basic body and a second end which is closed. The closed second end can be located at a cutting-end aperture of the basic body. The at least one of the at least one slits can comprise a first end that is closed at a rear-end of the basic body and a second end which is closed. The closed second end can be located at a cutting-end aperture of the basic body. All ends located at a cutting-end aperture of the basic body can be closed. A possible advantage of having all slit ends at the cutting-end aperture being closed can be to provide rigidity at a part of a basic body comprising a pull-out preventer. In such case, the cutting-end can be rigid (or non-compressible, due to it being free of slits open thereat). The at least one slit can be a plurality of slits of different axial extensions at the cutting-end aperture of the basic body. The at least one slit can be manufactured by slitting cutters.

ix. A pull-out preventer can be circumferentially located between two slit portions located at a cutting-end aperture. It will be understood that slits extending until at least an axial location of the pull-out preventer can facilitate compressibility of a basic body (while closure of the slits can maintain a rigidity, when desired). The pull-out preventer can be axially aligned with a slit formed in the basic body. The axial alignment of the pull-out preventer can be symmetrical with said one slit. Said aligned slit can open out to a rear-end of the basic body.

x. A basic body can comprise a mounting portion extending from a rear-end to a collar recess, and a collar portion extending from the collar recess.

xi. A collar portion can extend to an extension portion. The extension portion can comprise a cutting-end aperture of a basic body.

xii. A mounting portion can increase in external diameter from a rear-end to a collar recess.

xiii. A collar recess can have a smaller external diameter than adjacent portions of the rear-end and collar portion. The collar recess can have a cylindrical external shape.

xiv. A collar portion can decrease in external diameter from a collar recess in a direction towards a cutting-end of a basic body. A pullout-preventer can be located at the collar portion, for example, when no extension portion is present. In such case the collar portion can comprise the cutting-end aperture. It will be understood that a pull-out preventer can be located at a cutting-end aperture of a basic body, regardless of whether such cutting end is part of a collar portion, an extension portion, or a completely cylindrical milling collet, etc. A pull-out preventer or cutting-end aperture comprising same can be configured to not apply clamping force (e.g. radially directed forces) on an associated fluted tool. To elaborate, a possible advantage of including an extension portion can be for a basic body which would not otherwise have a sufficient clamping region. Such sufficiency being measurable or regulated by standards. Conversely, a possible advantage of a basic body free of an extension portion could be additional space for chip evacuation and greater protrusion of a tool from a basic body (allowing greater cutting range). In any case, a milling collet can be configured such that a portion thereof associated with a rear-end is configured for applying clamp force and a portion thereof associated with a cutting-end is configured not to apply a clamping force.

xv. An extension portion can have a circumferential wall. An extension portion can be cylindrical. A pull-out preventer can be formed at an extension portion. More precisely, the pull-out preventer can extend from a circumferential wall, which can constitute the extension portion, of a basic body. The extension portion's interior can comprise a cylindrical portion which has a larger diameter than a remainder of a through-hole extending therethrough. A cylindrical portion can be axially located between a pull-out preventer and a collar portion. An extension portion can be shaped or minimized to allow greater cutting range or chip evacuation. For example, an extension portion can be designed with an axial length which is no greater than three times an axial length of an associated pull-out preventer. Preferably, an axial length of an extension portion can be twice or less than an axial length of an associated pull-out preventer. It will be understood that an extension portion can be the same axial length as a pull-out preventer or greater.

xvi. A pull-out preventer and collet comprising same can be of one-piece unitary construction.

xvii. A pull-out preventer can comprise side surfaces which extend parallel to a longitudinal axis of a basic body.

xviii. A pull-out preventer can be elongated. The elongation can be in a direction parallel with a longitudinal axis of a basic body. It will be understood that enlargement of a pull-out preventer can provide constructional strength.

xix. A pull-out preventer can have a tapered shape. A pull-out preventer can comprise a front surface which extends in a plane perpendicular to a longitudinal axis of a basic body. A pull-out preventer can comprise a front surface which is curved or chamfered at an edge thereof which is the most inwardly radial edge thereof relative to a basic body. A pull-out preventer can comprise a front surface which is flush with a cutting-end front edge of the basic body. It will be understood that a flush front surface, or, more precisely, a minimized distance of a pull-out preventer to a cutting-end of a milling collet can allow a increased protrusion of a tool therefrom, and can increase depth of cut. A pull-out preventer can comprise an upper surface having a concave shape. A pull-out preventer can comprise side surfaces having concave shapes. In a plan view, an upper surface can have a quadrilateral shape. In a plan view, an upper surface can have a rectangular shape. The rectangular shape can be elongated in a longitudinal direction of a basic body from which it extends. It will be understood that a pull-out preventer can be shaped for protrusion into a flute. For example, a pull-out preventer can be configured with a block shape. Such block shape, can possibly provide constructional strength during contact with a tooth of a fluted tool. The block can be a solid block (i.e. free of voids). It will also be understood that flutes, by definition, are located between teeth and therefore can only partially circumferentially extend around a tool's fluted portion. Consequently, a pull-out preventer can be shaped for protrusion into a flute by being a shape which is not annular. Stated differently, a pull-out preventer can have a limited angular extension around a portion of a cutting-end aperture. For example, a pull-out preventer can have an angular extension which is less than half of a cutting-end aperture. More precisely, a maximum angular extension can be less than half of a circle. Even more precisely, a maximum angular extension can be less than a quarter of a circle. A maximum angular extension of even one-tenth of a circle has been found to be suitable for operational purposes. A minimum angular extension of a pull-out preventer, measured along an upper surface thereof, can be smaller than a maximum angular extension. A minimum angular extension of even one-twentieth of a circle, has been found to be suitable for operational purposes. A ratio of maximum angular extension to minimum angular extension of 2:1 can be suitable for operational purposes.

xx. A pull-out preventer can comprise a corner formed at an intersection of a rear surface, upper surface and a side surface which is configured as an abutment corner. The abutment corner can be the only abutment corner or abutment portion of the pull-out preventer.

xxi. A pull-out preventer can have a dimension extending in the inward radial direction from an inner surface of a cutting-end of the basic body which has a height magnitude of 1 mm or less.

xxii. Pull-out preventers tested thus far have been found to perform suitably with heights which are an order of magnitude less than an internal clamping diameter of the collet with which they are associated. More precisely, even a pull-out preventer height which is one-twentieth an internal clamping diameter of the collet has been found sufficient for operation.

xxiii. A through-hole can be cylindrical, except for the pull-out preventer. A cylindrical through hole may have sub-portions which are cylindrical with different diameters.

xxiv. A rear-end diameter of the through-hole at the rear-end aperture can be smaller than a cutting-end diameter of the through hole at a portion of the cutting-end aperture which connects to a collar portion.

xxv. Sizing of a pull-out preventer can include measuring a width of at least one flutes in an end view thereof. More precisely, a greatest dimension of a pull-out preventer in a plan view thereof can correspond to a dimension between adjacent teeth taken in a front view of a flute end of a fluted milling tool.

xxvi. Assembling of a cutting unit can comprise inserting the fluted milling tool's fluted-cutting portion into the milling collet via a rear-end aperture thereof. Assembling of a cutting unit can comprise adjusting a position of a fluted tool in a collet. Assembling of a cutting unit can comprise clamping only a shaft portion of the tool.

xxvii. A cutting unit can be configured such that a fluted tool is removable therefrom. Disassembling of a cutting unit can comprise removing a fluted tool from the collet.

xxviii. A cutting unit can be configured such that a tool shaft portion is too large to be conveyed through a cutting-end aperture of a milling collet.

xxix. A fluted milling tool can comprise a plurality of teeth separated by a plurality of flutes.

xxx. In a cross-sectional view of a cutting unit, which is perpendicular to a longitudinal collet axis and which passes through a pull-out preventer: a pull-out preventer occupying portion occupies one of said flutes. The pull-out preventer occupying portion can have an angular extension that is less than two-thirds, or even one-half, of an angular extension between a rear surface of one tooth and a rake surface of an adjacent tooth. The pull-out preventer occupying portion can have a first cross-sectional area of the pull-out preventer occupying portion is less than one-third of a second cross-sectional area of said one of said flutes.

xxxi. Operation of a cutting unit can comprise performing a ramp-down operation (i.e. cutting in a lateral and rearward direction simultaneously).

xxxii. A tool can have a tool shaft portion and a fluted-cutting portion. The fluted-cutting portion can extend from the shaft portion.

xxxiii. A milling collet can be secured to a chuck configured to move in a direction perpendicular to the milling collet axis.

xxxiv. A fluted milling tool can be configured for lateral cutting by having flutes shaped to form chips (as opposed to chip evacuation flutes) and/or teeth shaped for cutting along the entire length thereof.

xxxv. A fluted milling tool can be inserted into a through hole via a rear end of a basic body of a milling collet.

xxxvi. A pull-out preventer can be located adjacent to a tooth of a fluted tool.

BRIEF DESCRIPTION OF THE DRAWINGS

For a better understanding of the subject matter of the present application, and to show how the same may be carried out in practice, reference will now be made to the accompanying drawings, in which:

FIG. 1C is a partially sectioned side view of the cutting unit in FIGS. 1A and 1B, with a portion of a workpiece shown;

FIG. 1D is an enlarged view of an encircled portion in FIG. 1C;

FIG. 1E is a cross section view taken along line 1E-1E in FIG. 1C, excluding the workpiece;

FIG. 2C is a rear view of the collet in FIGS. 2A and 2B;

FIG. 2D is a side view of the collet assembly in FIGS. 2A to 2C;

FIG. 2E is a front view of the collet assembly in FIGS. 2A to 2D;

Where considered appropriate, reference numerals may be repeated among the figures to indicate corresponding elements.

DETAILED DESCRIPTION

Figure 1A:
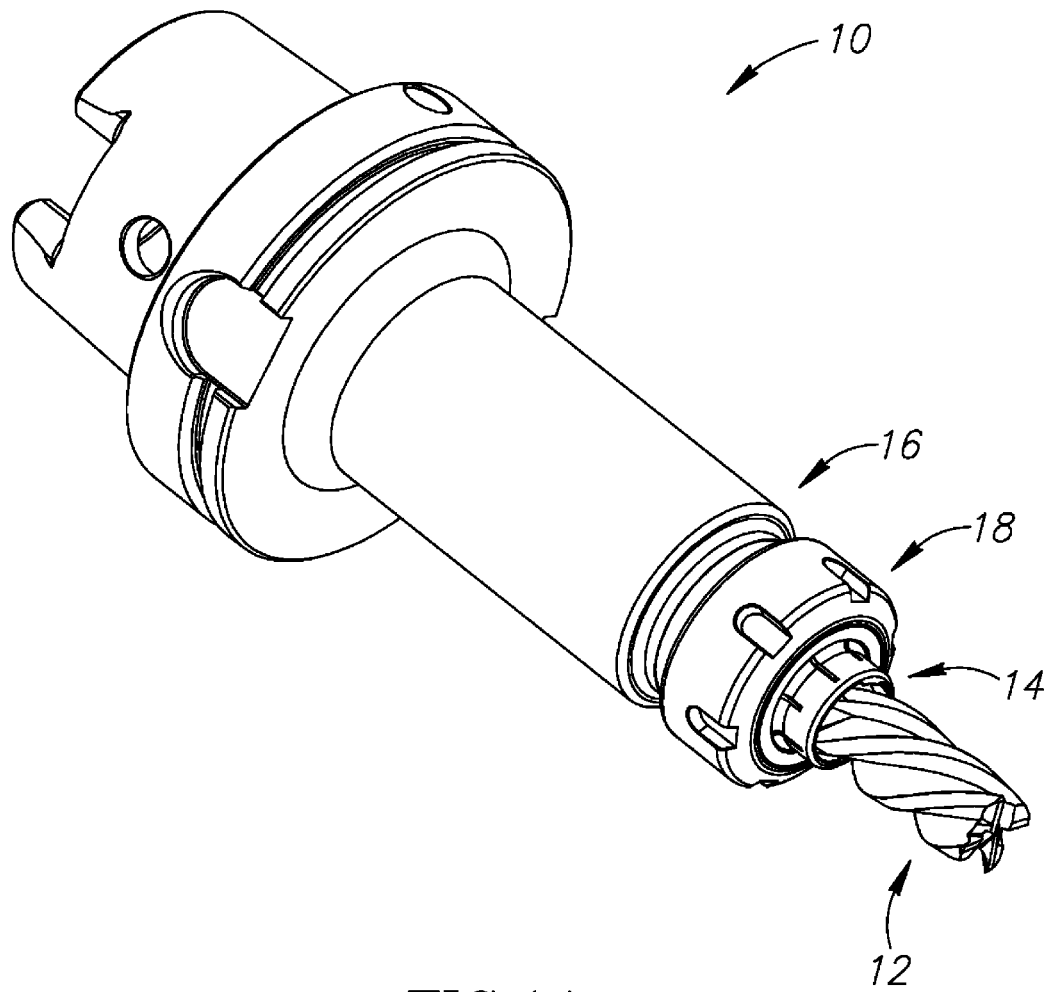
FIG. 1A is a front perspective view of a cutting unit.

Reference is made to FIGS. 1A to 1E, illustrating a cutting unit 10, which will initially be described generally. The cutting unit 10 can comprise a fluted milling tool 12, a milling collet 14 through which the tool 12 can be inserted, and a chuck 16 configured for holding the milling collet 14. Depending on the type of cutting unit 10, it can also comprise a collar 18 configured for securing the milling collet 14 to the chuck 16. The collar 18 can be configured to compress the milling collet 14 for gripping the tool 12 received therein. There may also be benefit in the cutting unit 10 comprising a preset screw 20, for setting an axial position of the tool 12.

Figure 1B:
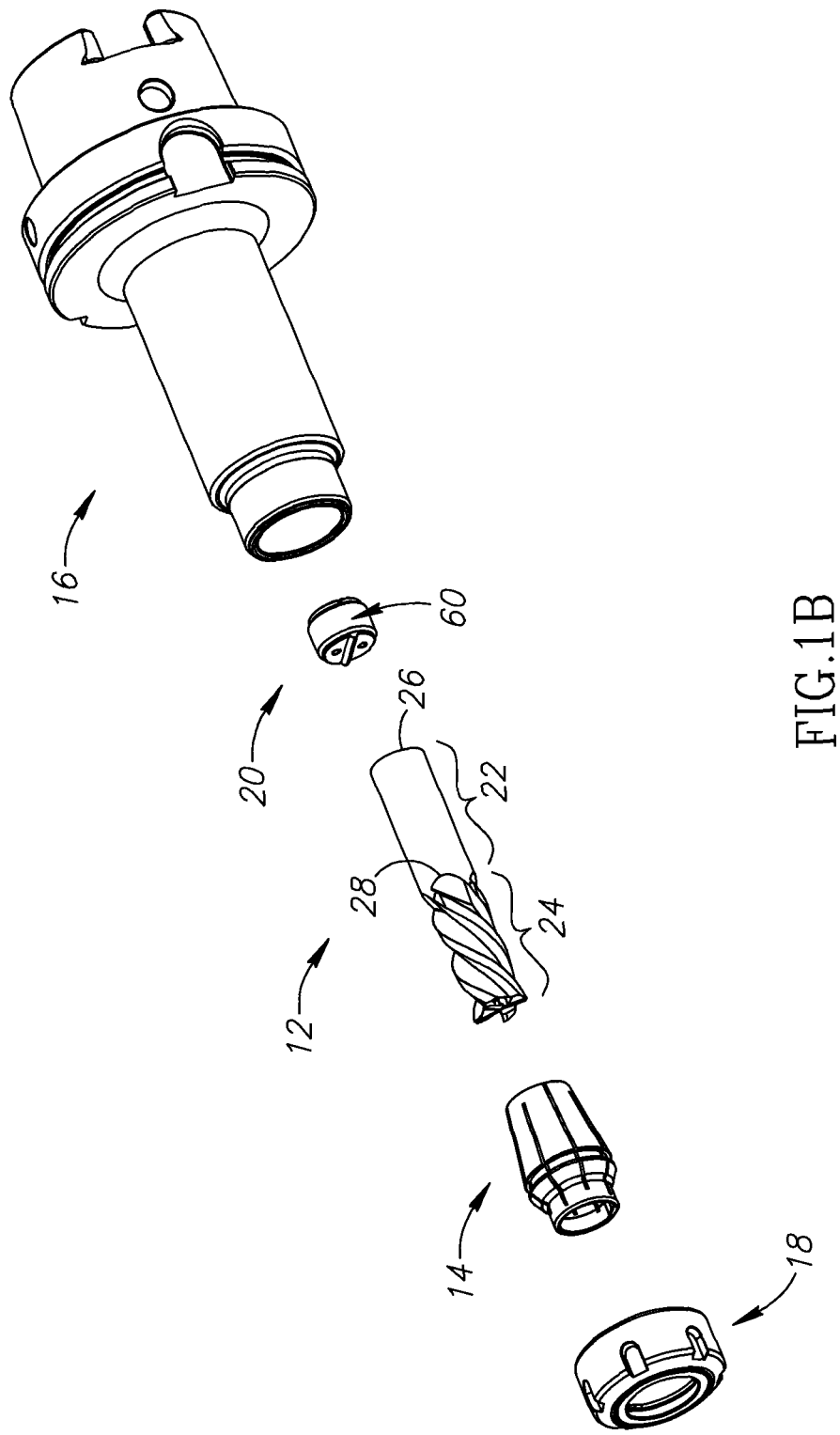
FIG. 1B is an exploded view of the cutting unit in FIG. 1A.

Drawing attention to FIG. 1B, the tool 12 comprises a tool shaft portion 22 and a fluted-cutting portion 24. The tool 12 can be elongated. The tool shaft portion 22 can extend from a tool rear-end 26 to the fluted-cutting portion 24. The fluted-cutting portion 24 can extend from one or more flute ends 28 (beyond which is the tool shaft portion 22) to a tool forward end 30.

The tool shaft portion 22 can be cylindrical. More precisely, the tool shaft portion 22 can be a standard tool shaft portion. For example, the tool shaft portion can be of the type illustrated in international standards. Stated differently, the tool shaft portion can be free of customized locking elements or grooves, for example the helical or curved cylindrical shaped grooves of the type disclosed in US 2009/0179368. Similarly, the tool 12 itself can be a standard tool, and any of the chuck 16, collar 18 and preset screw 20, can also be of a standard type. It will be understood that there can be a reduced-cost advantage of using standard or non-customized components.

Referring to FIG. 1E, the fluted-cutting portion 24 is shown to have a plurality of flutes separated by a corresponding plurality of cutting teeth. This embodiment is shown to have four flutes 32A, 32B, 32C, 32D which are separated by four cutting teeth 34A, 34B, 34C, 34D. Each tooth 34 has opposing rake and rear surfaces 36, 38 and a relief surface 40 connecting the rake and rear surfaces 36, 38.

Figure 2A:
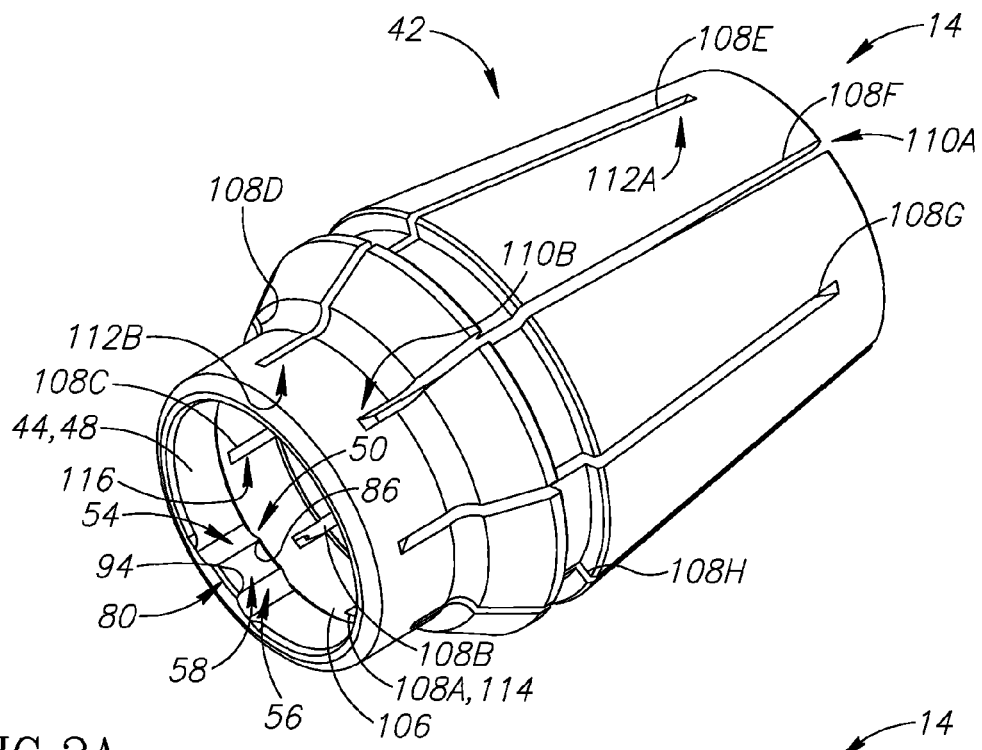
FIG. 2A is a front perspective view of the collet in FIGS. 1A and 1B;.
Figure 2B:
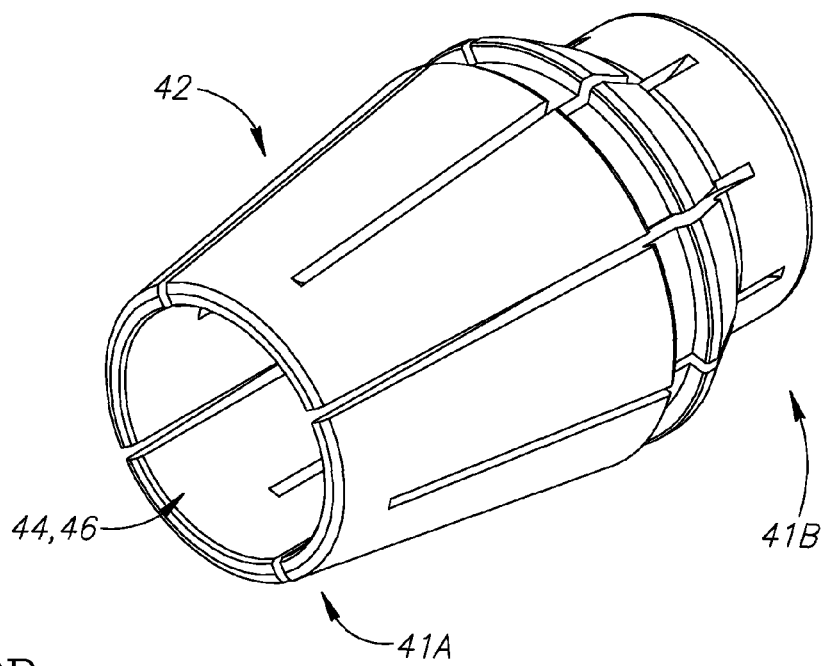
FIG. 2B is a rear perspective view of the collet in FIG. 2A.

Referring to FIGS. 2A and 2B, the milling collet 14 comprises a sleeve-shaped basic body 42. The basic body 42 can be configured for compression. The basic body can comprise a rear-end 41A that is configured for being secured or held to the chuck 16, and a cutting-end 41B from which the fluted-cutting portion 24 protrudes. The basic body 42 can be formed with a through-hole 44 extending from opposing rear-end and cutting-end apertures 46, 48.

A pull-out preventer 50, which in this example is constituted as a single member, is located at the cutting-end aperture 48 and extends, in a radially-inward direction (shown by arrow 52 in FIG. 2E), into the through-hole 44. Notably, the extent of the pull-out preventer 50 into the through-hole 44 can be greater than any other portion of the milling collet. The pull-out preventer 50 can be the only element radially projecting into the through hole.

The pull-out preventer 50 can be formed with a first flank surface 54, a second flank surface 56 and an upper surface 58.

Referring to FIGS. 1A to 2B, assembly and operation of the subject matter of the present application may include any of the following actions.

The cutting unit 10 can be assembled by:

inserting the preset screw 20 in the chuck 16;

inserting the tool's forward end 30 into the basic body's rear-end aperture 46;

sliding the tool 12 through the basic body 42 such that the pull-out preventer 50 enters one of the flutes 32A, or, stated differently, is located between two adjacent teeth 34A, 34D (in any case the pull-out preventer of the milling collet is located adjacent to a tooth of a fluted-cutting portion of the tool as shown, for example, in FIGS. 1D and 1E);

mounting the milling collet 14 to the chuck 16;

operating the preset screw 20 (operation can be by rotation thereof to allow external threading 60 thereof to engage internal threading 62 of the chuck (FIG. 1C)) to select a desired axial protrusion of the tool 12;

securing the milling collet 14 to the chuck 16 (in a case where one is present, via use of the collar 18, which can also compress the milling collet 14 such that it clamps at least the tool shaft portion 22 therein); a rear-end of the milling collet being configured for being secured to the chuck 16;

clamping only the tool's shaft portion 22 in the milling collet 14 (in this example by fastening the collar 18 to the milling collet 14 and chuck 16);

causing relative rotation of the tool 12 and an associated workpiece 64 (FIG. 1C);

carrying out a lateral machining operation; for example, causing relative lateral movement of the tool 12 and the workpiece 64 (for example in a lateral direction designated by the arrow 70, which in this non-limiting example designates a direction perpendicular to tool axis $A_T$), such that there is removal of material (not shown) from the workpiece 64, or more precisely a surface 66 thereof that is not aligned with the tool axis $A_T$ (for example the surface designated as 68 can be considered aligned with the tool axis $A_T$);

removing the tool 12 from the cutting unit 10, via opposite actions to those mentioned above (in particular, withdrawing the tool's forward end 30 from the basic body's rear-end aperture 46).

It will be understood that the statements above do not preclude use of the cutting unit 10 or tool 12 also being configured for cutting in the axial direction 72 (as embodiments in accordance with the subject matter of the present application may be associated with tools configured for cutting in any desired direction). Rather such statements are specifically made in connection to lateral motion or lateral cutting, is because it has been found that such pull-out phenomena occurs during lateral cutting motion (or, for example, a simultaneous lateral cutting motion and rearward axial cutting motion 76), due to application of forces on the tool 12.

More precisely, referring to FIG. 1E, the tool 12 cuts when rotated in a cutting direction 78, which in this non-limiting example is a clockwise direction. During lateral cutting, forces applied on the fluted-cutting portion 24 can urge the tool 12 in a direction opposite to the cutting direction 78 (relative to the milling collet 14). Pull-out of the tool 12 from the milling collet 14 can be caused by such relative motion. According to the subject matter of the present application, the pull-out preventer 50 is configured for preventing such motion by stopping an adjacent tooth 34A from rotating in a direction opposite to the cutting direction 78 (relative to the milling collet 14). Such motion can be arrested by contact of the rear surface 38 of the adjacent tooth 34A with the pull-out preventer 50.

In FIG. 1E contact of the rear surface 38 and the first flank surface 54 are separated by a small distance, as could be the case before the above-mentioned relative motion occurs. It will be understood that in the assembled position, the rear surface 38 and the first flank surface 54 could already be in contact, even before any undesired pull-out forces are applied on the tool 12.

It will be understood that one possible advantage relating to the above-described construction, can be that a pull-out preventer can be positioned at different axial positions (i.e., in the example above, at different positions along the tool axis $A_T$). Stated differently, such pull-out preventer could be positioned at any position along a flute or tooth of a tool, given that there is some protrusion of the tool from the milling collet 14.

For example, the tool 12 could be positioned in the cutting unit 10 or milling collet 14, such that:
only a minority of the fluted-cutting portion 24 protrudes thereout;
the fluted-cutting portion 24 protrudes thereout to the maximum extent possible, i.e. wherein the pull-out preventer 50 engages the flute end 28 associated with the flute 32A within which it is located; or
some extent of protrusion between the two above-stated extents.

In all of the examples above, at least a portion of the fluted-cutting portion 24 can be located within the milling collet 14 or cutting-end aperture 48.

Regarding location of the tool shaft portion 22, an entirety of the tool shaft portion 22 can be located within the milling collet 14. Alternatively, as shown, the tool shaft portion 22 can be partially within the milling collet 14 and the remainder thereof can be within the chuck 16.

More specific yet exemplary features of subject matter of the present application are as follows.

Referring to FIGS. 2E and 2D, a longitudinal milling collet axis $A_M$ can extend through the center of the milling collet 14. As best seen in FIGS. 2C and 2E, the pullout preventer 50 comprises at least one member which projects in a radially inward direction, when the milling collet 14 is viewed along the milling collet axis $A_M$.

As seen in the cross-section of FIG. 1E, the pullout preventer, 50 projects in a radially inward direction from a circumferential wall 35 of the milling collet 14.

The first and second flank surfaces 54, 56 and the upper surface 58 can extend parallel with the milling collet axis $A_M$, which is coaxial with the tool axis $A_T$ in the assembled states shown in FIGS. A1, and 1C to 1E. As shown in FIG. 2E, the first and second flank surfaces 54, 56 and the upper surface 58 can be concavely-shaped.

As best shown in FIG. 2A, the pull-out preventer 50 can be elongated in a direction parallel with the milling collet axis $A_M$ (FIG. 2D).

The pull-out preventer can also comprise front and rear surfaces 80, 82.

As best shown in FIG. 1D, the front surface 80 can extend in a plane $P_M$ perpendicular the milling collet axis $A_M$. Stated differently, the front surface 80 can be flush with a cutting-end front edge 84 of the basic body. It will be understood that proximity of the pull-out preventer to a front edge 84 of the basic body can facilitate the possibility of greater protrusion of a fluted-cutting portion thereout. It will also be understood that this can also be accomplished by maximizing pull-out preventer 50 volume at the front edge 84, i.e. by being flush therewith, resulting in less volume needing to be located at a distance from the front edge 84.

According to some embodiments, stopping relative motion of the tool 12 and milling collet 14 can be by single point contact of the pull-out preventer 50, more specifically an abutment corner 86 (FIGS. 2A and 4) thereof. The abutment corner 86 can be formed at an intersection of the rear surface 82, upper surface 58 and first flank surface 54.

It will be understood that a pull-out preventer can be designed to be used with different tools, increasing the versatility thereof.

Figure 3:
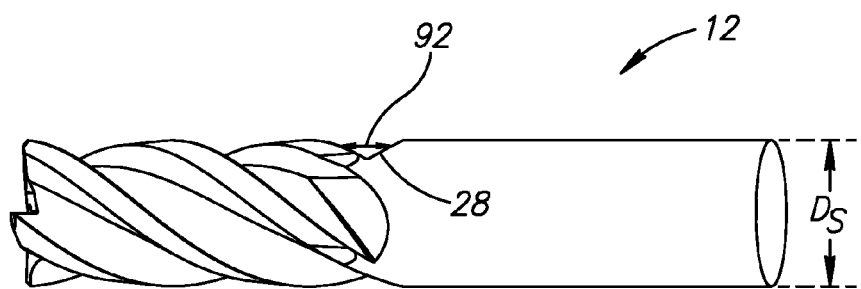
FIG. 3 is a foreshortened view of a tool which shows a front view of a flute-end thereof.
Figure 4:
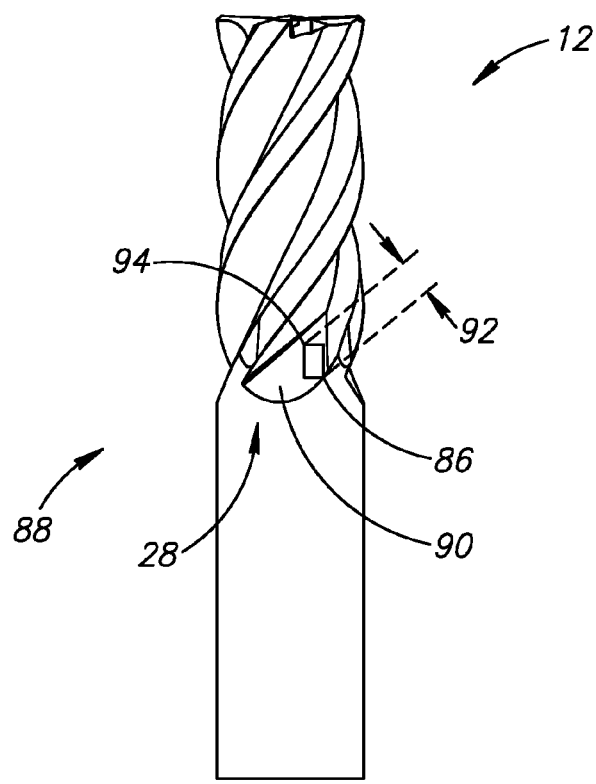
FIG. 4 is a schematic plan view of a tool and a pull-out preventer.

Referring to FIGS. 3 and 4, a possible design method is as follows.

A set of related tools can be chosen. For example a set of solid carbide tools comprising fluted-cutting portions and shank portions. Each of the shank portions having a common diameter $D_S$, which in this example is a 20mm diameter. An example solid carbide tool 12 is shown in FIGS. 3 and 4.

The flutes can be measured at the smallest dimension thereof (typically at the flute-end 28).

The measuring can be accomplished in a view of the flute shown in FIG. 3, and schematically indicated by arrow 88 in FIG. 4 (arrow 88 being parallel with a length dimension of the flute-end 28). Additionally, in such view (FIG. 3) the tool is rotated until a floor 90 is perpendicular to the view taken (and hence not visible).

A flute dimension 92 can be measured perpendicular to the view, as shown in FIG. 3.

The measured dimension can constitute a maximum dimension 92 of the pull-out preventer 50. For example, the maximum dimension 92 can correspond to a length between the abutment corner 86 and a diagonally opposing corner 94 on the upper surface 58.

A height of the pull-out preventer 50 can be enlarged to a size that the pull-out preventer 50 can be disposed within the flute-end 28.

A suitable pullout preventer designed for tool having a 20 mm diameter shank was: 1 mm height, 4.5 mm length (along a longitudinal axis, e.g., the milling collet axis $A_M$), and 2.6 mm width (along a direction perpendicular to the longitudinal axis). While tools may differ as to the precise flute dimensions thereof, it is believed that similar ratios of dimensions (e.g. height to length 1:4 or 1:5; height to width 1:2 or 1:3; length to width 2:1) may be suitable for many tool types.

Pull-out preventers tested thus far have been found to perform suitably with heights which are at least an order of magnitude less than an internal clamping diameter of the collet which they are associated with. More precisely, even a pull-out preventer height which is one-twentieth an internal clamping diameter of the collet has been found sufficient for operation.

The maximum angular extension ($\epsilon$; FIG. 2C) of a pull-out preventer, measured relative to an interior of a cutting-end within which it is disposed, should be less than an angular extension between adjacent teeth of a tool which can be inserted into the cutting-end. Given that fluted-cutting portions are typically symmetrical, the maximum angular extension ϵ must be less than half of a circle. The maximum angular extension ϵ could even be less than a quarter of a circle, for example when designing a single-member pull-out preventer. In the present non-limiting example the maximum angular extension ϵ is one-tenth of a circle. Such extent has been found to be suitable for operational purposes.

Similarly, the pull-out preventer can have a minimum angular extension (β; FIG. 2E) measured along the upper surface 58, which can be smaller than the maximum angular extension ϵ. In the present non-limiting example the minimum angular extension β is one-twentieth of a circle. Such extension has been found to be suitable for operational purposes.

Consequently, it has been found that a ratio of maximum angular extension ϵ to minimum angular extension β of 2:1 can be suitable for operational purposes.

As seen in the cross-section of FIG. 1E, the size and shape of the pull-out preventer occupying portion 51 that occupies one of the flutes of the fluted milling tool does not correspond to the size and shape of that flute. At its base where it merges with the circumferential wall 35, the pull-out preventer occupying portion 51 has an angular extension that can be less than two thirds, and in this example less than one-half, of the angular extension between the rear surface 38 of one tooth 34A and the rake surface 36 of an adjacent tooth 34D. Also, a first cross-sectional area of the pull-out preventer occupying portion 51 which occupies the one flute is less than one-third of a second cross-sectional area of that one flute.

Further features of the milling collet 14 will now be described.

The pull-out preventer and milling collet can be of one-piece unitary construction. It will be understood that such construction may allow a collet to have no falling parts, and may allow efficient manufacturing thereof.

For example, after manufacture of the basic body of the collet 14, an interior of the cutting-end 41B can be milled to reduce the original diameter thereof except for at least one portion, i.e. the at least one portion constituting an inwardly projecting pull-out preventer 50. The milling process reduces the original diameter by a differential wall thickness Δt, thereby creating an inner circumferential wall 35 from which the pull-out preventer 50 inwardly projects, as depicted in FIG. 1E. It will be understood that the differential wall thickness Δt results in the aforementioned height of the pull-out preventer 50

As shown in FIGS. 2C and 2E, an inscribed diameter $D_{CA}$ at the cutting-end aperture 48 can be smaller than the inscribed diameter of the basic body 42 $D_{CB}$ at the rear-end 46 thereof (hereinafter also referred to as the rear-end inscribed diameter $D_{CB}$).

It will be understood that the diameter $D_S$ of the tool shaft portion (which in this example is a circle due to the tool shaft portion being cylindrical, but could also be considered a circumscribed diameter $D_S$ when this is not the case) is larger than the smallest inscribed diameter $D_{CA}$ at the cutting-end.

Referring to FIG. 2D, portions of the basic body 42 exemplified will be described. The basic body 42 can comprise standard collet portions. Such portions can include: a frustoconical mounting portion 96, extending from, and increasing in outer diameter, the rear-end 46 to a collar recess 98, and a frustoconial collar portion 100 extending from the collar recess 98 and decreasing in outer diameter therefrom.

The internal diameter of the mounting portion 96, collar recess 98, and collar portion 100, can be a single diameter corresponding to the rear-end inscribed diameter $D_{CB}$. It will be understood that clamping of a tool can be performed along the length of the through-hole 44 along the portions having the rear-end inscribed diameter $D_{CB}$.

Optionally, an extension portion 102 can be added to the otherwise standard portions of the basic body 42. The extension portion 102 can extend from the collar portion 100. Therefore, in this non-limiting example, the extension portion 102 comprises the cutting-end aperture 48 of the basic body 42. In this example, the pull-out preventer 50 extends from a circumferential wall 104 of the extension portion. The circumferential wall can be cylindrical, excluding the pull-out preventer 50. The extension portion's interior can comprise a recessed cylindrical portion 106 (FIG. 2A) which has a larger diameter than a remainder of the through-hole 44.

Referring to FIG. 2A, the basic body 42 can be formed with longitudinally extending slits 108A-H.

Every second slit 108B, 108D, 108F, 108H can comprise a first end 110A that opens out at the rear-end 46 and a second end 110B which is closed.

Every second slit between the slits mentioned above 108A, 108C, 108E, 108G, can be closed at both ends 112A, 112B thereof.

As best shown in FIGS. 2A, 2C and 2E, the pull-out preventer 50, in this non-limiting example, is circumferentially located between two slit portions 114, 116, and can be axially aligned with one of the slits 108B (FIG. 2E).

The description above includes exemplary embodiments and details for enablement, if needed, of claimed subject matter, and does not exclude non-exemplified embodiments and details from the claim scope of the present application.

What is claimed is:

1. A milling collet comprising
 a sleeve-shaped basic body having a longitudinal milling collet axis, and a pull-out preventer comprising one or more members which project in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; wherein the pull-out preventer is located at the cutting-end aperture; wherein the pull-out preventer and milling collet are of one-piece unitary construction; wherein the one or more members of the pull-out preventer collectively have an angular extension which is less than half of the cutting-end aperture; and wherein the milling collet comprises only a single pull-out preventer.

2. The milling collet according to claim 1, wherein an inscribed diameter at the cutting-end aperture is smaller than an inscribed diameter at the rear-end.

3. The milling collet according to claim 1, wherein the pull-out preventer comprises a single member only.

4. The milling collet according to claim 1, wherein the pull-out preventer is circumferentially located between two slit portions located at the cutting-end aperture.

5. The milling collet according to claim 1, wherein the pull-out preventer is axially aligned with a slit formed in the basic body.

6. The milling collet according to claim 5, wherein the slit opens out to the rear-end.

7. The milling collet according to claim 1, wherein the basic body further comprises a mounting portion extending from the rear-end to a collar recess, a collar portion extending from the collar recess to an extension portion, the extension portion comprising the cutting-end aperture of the basic body.

8. The milling collet according to claim 7, wherein the extension portion has a cylindrical shape.

9. The milling collet according to claim 1, wherein the through hole is cylindrical, except for the pull-out preventer, and has sub-portions which are cylindrical with different diameters.

10. The milling collet according to claim 1, wherein the pull-out preventer comprises side surfaces which extend parallel to a longitudinal axis of the basic body.

11. The milling collet according to claim 1, wherein the pull-out preventer is elongated in a direction parallel with a longitudinal axis of the basic body.

12. The milling collet according to claim 1, wherein the pull-out preventer has a tapered shape.

13. The milling collet according to claim 1, wherein the pull-out preventer comprises a front surface which is flush with a cutting-end front edge of the basic body.

14. The milling collet according to claim 1, wherein the pull-out preventer comprises an upper surface and/or side surfaces, having a concave shape.

15. The milling collet according to claim 1, wherein the pullout preventer has an angular extension which is less than a quarter of a circle.

16. The milling collet according to claim 1, wherein the pull-out preventer has a solid shape.

17. A cutting unit comprising
a fluted milling tool comprising a cylindrical tool shaft portion and a fluted-cutting portion, and
a milling collet comprising a sleeve-shaped basic body having a longitudinal milling collet axis, and a pull-out preventer comprising at least one member which projects in a radially inward direction, when the milling collet is viewed along the milling collet axis, the basic body and the pull-out preventer having one-piece unitary construction;
the basic body comprising
a rear-end,
a cutting-end, and
a through-hole that extends from a rear-end aperture located at the rear-end to an opposing cutting-end aperture located at the cutting-end;
the pull-out preventer being located within a flute of the fluted-cutting portion, and the cylindrical tool shaft portion being clamped by at least the rear end of the basic body proximate to the rear-end aperture.

18. The cutting unit of claim 17, wherein the fluted-cutting portion comprises a plurality of teeth, the greatest dimension of the pull-out preventer in an upper surface view thereof corresponds to a dimension between adjacent teeth of the plurality of teeth, taken in a front view of a flute end of the fluted milling tool.

19. The cutting unit of claim 17, wherein the basic body further comprises a mounting portion proximate to the rear-end aperture, the mounting portion having a single inner diameter to clamp the cylindrical tool shaft portion.

20. A method of retaining a fluted milling tool comprising a cylindrical tool shaft portion and a fluted-cutting portion, and configured for lateral cutting, the method comprising:
providing a milling collet comprising a sleeve-shaped basic body having a longitudinal milling collet axis and a pull-out preventer comprising at least one member which projects in a radially inward direction, when the milling collet is viewed along the milling collet axis; the basic body comprising a rear-end, a cutting-end, and a through-hole that extends from a rear-end aperture located at the rear-end to an opposing cutting-end aperture located at the cutting-end; and
inserting the fluted milling tool into the through hole of the milling collet such that the pull-out preventer of the milling collet projects into a flute of the fluted milling tool, and the cylindrical tool shaft portion is clamped by the rear-end of the basic body proximate to the rear-end aperture.

21. The method according to claim 20, wherein the pull-out preventer and milling collet are of one-piece unitary construction and the fluted milling tool is inserted into the through hole via the rear end of the basic body of the milling collet.

* * * * *